United States Patent
Taylor et al.

(10) Patent No.: US 6,433,790 B1
(45) Date of Patent: *Aug. 13, 2002

(54) METHODS AND SYSTEMS FOR RENDERING LINE AND POINT FEATURES FOR DISPLAY

(75) Inventors: Ralph Clayton Taylor, Deland; Daniel B. Clifton, Rockledge, both of FL (US); David Gotwalt, Los Gatos, CA (US); Michael A. Mang, Oviedo, FL (US); Thomas A. Piazza, Granite Bay, CA (US); Jeffrey D. Potter, Winter Springs, FL (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/234,133

(22) Filed: Jan. 19, 1999

(51) Int. Cl.$^7$ ................................................ G09G 5/36

(52) U.S. Cl. .................... 345/611; 345/606; 345/441

(58) Field of Search ................................ 345/136, 418, 345/430, 422, 431, 432, 133, 137, 611, 606, 607, 608, 609, 421, 629, 612, 613, 614, 641, 646, 441; 382/269, 241; 348/167, 168

(56) References Cited

U.S. PATENT DOCUMENTS

| | | | |
|---|---|---|---|
| 5,490,238 A | * | 2/1996 | Watkins ...................... 345/422 |
| 5,872,902 A | * | 2/1999 | Kuchkuda et al. .......... 345/430 |
| 5,977,977 A | * | 11/1999 | Kajiya et al. ............... 345/418 |

* cited by examiner

Primary Examiner—Matthew Luu
Assistant Examiner—Thu-Thao Havan
(74) Attorney, Agent, or Firm—Scully, Scott, Murphy & Presser

(57) ABSTRACT

A method and system for rendering a feature, such as a line, for display on an array of pixels. With this method, the line is identified on the pixel array, the line is expanded into a polygon, and color values are determined for the pixels within the polygon. Also, an antialiasing region is identified in the polygon, and blend values are computed for the pixels in this antialiasing region. Then, the color values determined for the pixels in the antialiasing region are modified as a function of these computed blend values. The pixels in the antialiasing region may then be shown at their modified color values, while the pixels that are in the polygon but not in the antialising region may be shown at their original determined color value. Preferably, the blend values for the pixels in the antialiasing region are calculated as a function of the locations of the pixels in that region. For example, the blend value for each of these pixels may be calculated as a function of four values, each one representing the Manhattan distance from the pixel to a respective one of the edges of the polygon. Also, preferably the antialiasing region has a uniform width, and this region extends inward from side edges and outward from end edges of the formed polygon.

19 Claims, 7 Drawing Sheets

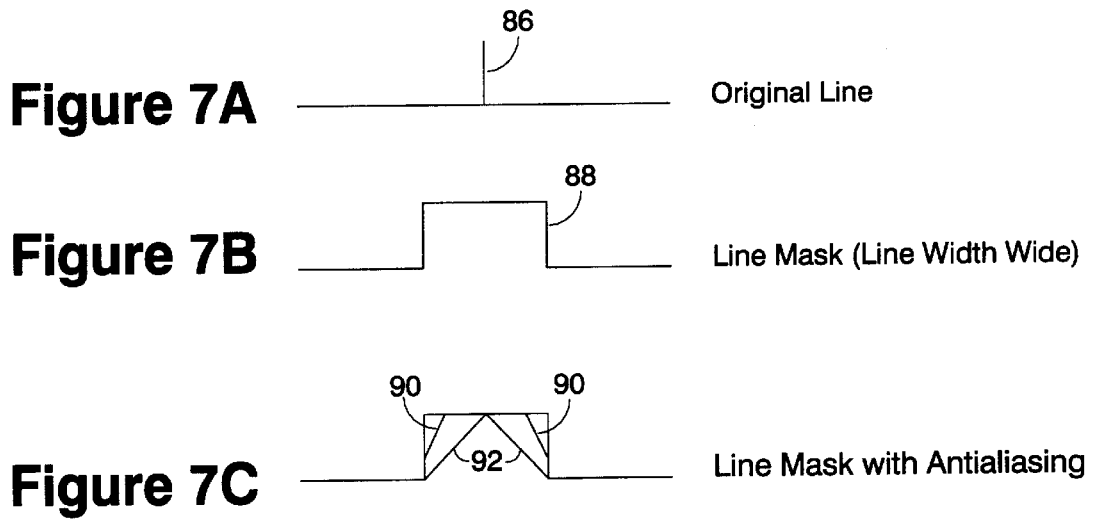
Figure 7A Original Line
Figure 7B Line Mask (Line Width Wide)
Figure 7C Line Mask with Antialiasing
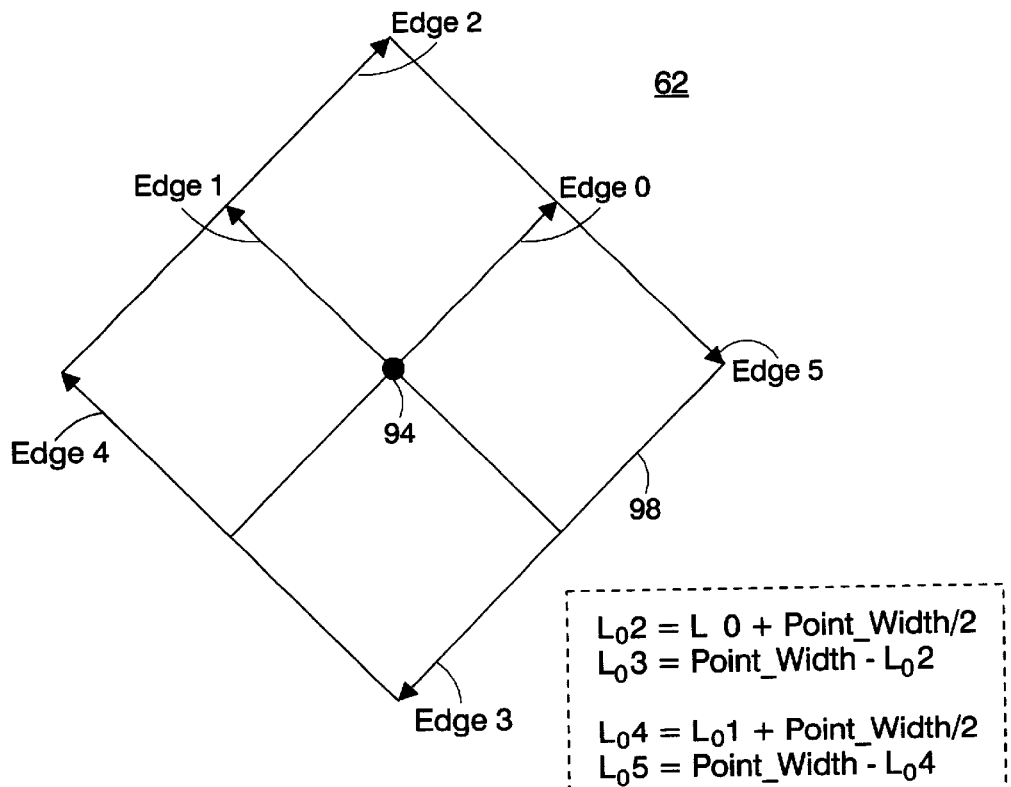
$L_o2 = L_0 + Point\_Width/2$
$L_o3 = Point\_Width - L_o2$
$L_o4 = L_o1 + Point\_Width/2$
$L_o5 = Point\_Width - L_o4$
Figure 8

METHODS AND SYSTEMS FOR RENDERING LINE AND POINT FEATURES FOR DISPLAY

BACKGROUND OF THE INVENTION

The present invention generally relates to methods and apparatus for displaying images in a computer controlled raster display system. More particularly, this invention relates to procedures for determining the pixels affected by lineal or point features in such images and for rendering those features for display.

Many modern computer systems are able to display complex three-dimensional objects on display devices that are controlled by the computer systems, and commonly these complex objects are displayed interactively to allow the computer user to manipulate the objects. Well known graphics techniques for rendering these three dimensional objects such as Gouraud shading, hidden surface algorithms, clipping, filling polygons and coordinate transformations are used to generate the displayed object on a suitable device, such as a CRT video display that is controlled by the computer system.

Often in the operation of these computer systems, a polygon representation of the object is converted to a raster scanned image that is stored in a frame buffer. Typically, various parameter values, such as color, depth and translucency, are given for the vertices of the polygon, and in a process referred to as scan conversion, the computer uses the given values to compute values for these parameters for the pixels inside the polygon. The computed values are stored in the frame buffer at the resolution of the display device; and from the frame buffer, these values may be used to produce an image of the object on the display device.

With these prior art computer graphics systems, difficulties may be encountered when displaying images of, or drawing, lines and points; and in particular, lines and points often have a jagged appearance. Among other disadvantages, this jagged look reduces the realism of a displayed image. The display of jagged lines and points is largely the result of the fact that only a portion of an actual pixel is covered by a line or point and is also due to the fact that the pixels on the display device have a finite size rather than being infinitely small points.

The appearance of jagged lines and points can sometimes be improved by modifying the original color values computed for the pixels used to show the lines and points, and commonly the color values for these pixels are modified to blend better with the color values for adjacent pixels. The display of unwanted jagged lines or edges is one type of a class of undesirable visual effects generally called aliasing, and procedures for eliminating or improving the appearance of jagged lines and points are one type of a group of procedures referred to as anti-aliasing. Prior art anti-aliasing techniques for eliminating or ameliorating the visual effects of jagged lines and points are typically cumbersome or not fully effective.

SUMMARY OF THE INVENTION

An object of this invention is to provide a simple, inexpensive and effective method and apparatus for determining the pixels affected by lineal or point features in a computer controlled image display system.

Another object of the present invention is to use planar edge equations to determine the pixels affected by lineal or point features in a computer controlled image display system.

A further object of the present invention is to provide a simple, inexpensive and effective method and apparatus for computing approximate area-weighting of pixels affected by lineal or point features for use with antialiasing.

Another object of this invention is to utilize planar edge equations to compute approximate area weighting of pixels affected by lineal or point features for use with antialiasing.

A further object of this invention is to identify an anti-aliasing region in a polygon used to show a line or point on a pixel array, and to determine color blend values for pixels in that antialiasing region as a function of planar edge coefficients calculated for those pixels.

These and other objectives are attained with a method and system for rendering a feature, such as a line, for display on an array of pixels. With this method, the line is identified on the pixel array, the line is expanded into a polygon, and color values are determined for the pixels within the polygon. Also, an antialiasing region is identified in the polygon, and blend values are computed for the pixels in this antialiasing region. Then, the color values determined for the pixels in the antialiasing region are modified as a function of these computed blend values. The pixels in the antialiasing region may then be shown at their modified color values, while the pixels that are in the polygon but not in the antialising region may be shown at their original determined color value.

Preferably, the blend values for the pixels in the antialiasing region are calculated as a function of the locations of the pixels in that region. For example, the blend value for each of these pixels may be calculated as a function of four values, each one representing the Manhattan distance from the pixel to a respective one of the edges of the polygon. Also, preferably the antialiasing region has a uniform width, and this region extends inward from side edges and outward from end edges of the formed polygon.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIGS. 7A–7C conceptually illustrate the affect of the antialiasing procedure of this invention.

FIG. 8 shows a point on a pixel array and a rectangular polygon formed from that point.

DETAILED DESCRIPTION OF THE PREFERRED EMBODIMENTS

Figure 1:
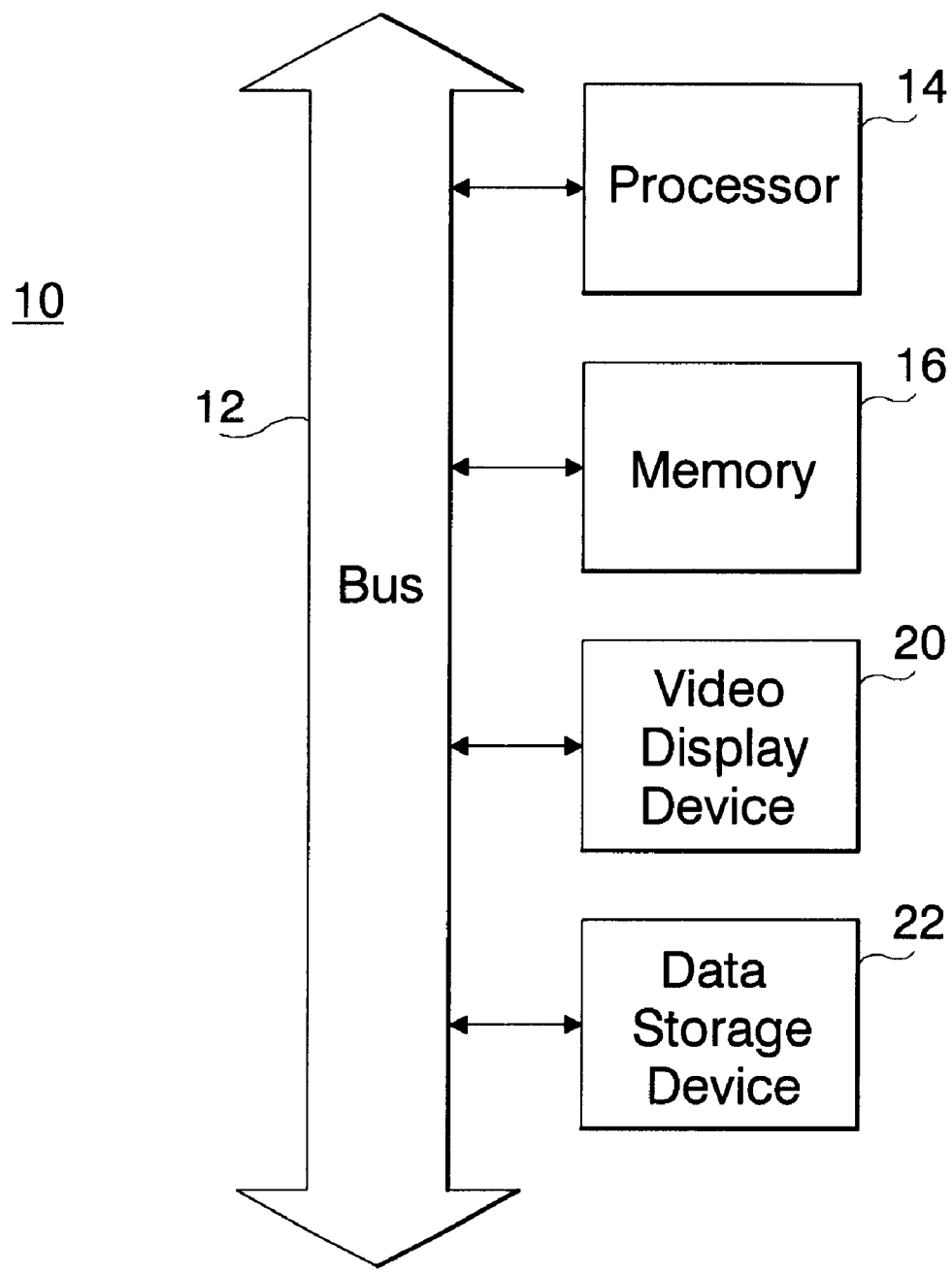
FIG. 1 schematically illustrates a computer graphics system that may be used to embody the present invention.

Computer system 10 illustrated in FIG. 1 includes a bus 12 for communicating information, a processor 14 coupled with the bus for processing information, and a memory 16 such as a RAM that is coupled with the bus for storing information and instructions for the processor. System 10 further includes video display device 20, such as a CRT raster scan device, and a data storage device 22, such as a magnetic disc, coupled with the bus 12 that is also used to store information and instructions.

Alternative computer systems having specifically designed graphics engines are well known in the art. Commonly, these alternative computer systems modify the system of FIG. 1 by incorporating a specialized graphics subsystem that includes a graphics processor, a dedicated frame buffer, often in the form of video RAM, and a video display.

Figure 2:
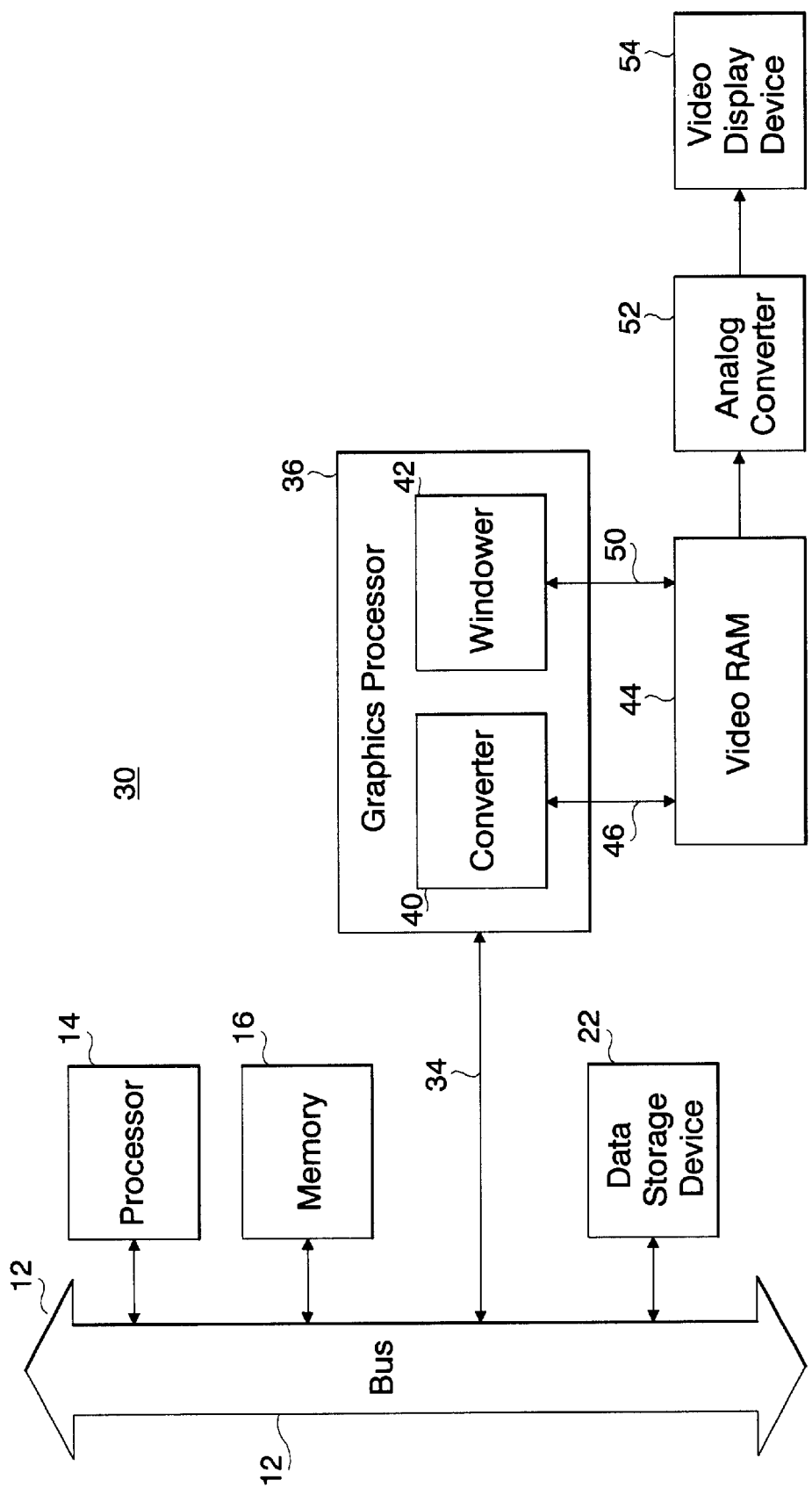
FIG. 2 illustrates another computer graphics system that may also be used to embody this invention.

FIG. 2 shows an example of a computer system 30 having a graphics subsystem 32. In this system 30, image data from the main processor 14 is communicated over bus 12 and bus 34 to the graphics processor 36. This image data is typically in the form of graphics primitives such as lines, points, polygons or character strings. The graphics processor 36 receives image data from the main processor 14 and uses that data to create an image that is rendered by utilizing well known graphics techniques such as scan conversion, clipping, Gouraud shading and hidden surface algorithms.

As schematically represented in FIG. 2, graphics processor 36 includes, among other items, a plane converter 40 and a windower 42. The plane converter 40 receives the attribute values for each vertex of the polygon and performs various calculation using these values; and the windower 42, among other functions, calculates attribute values for individual pixels on the display device.

The image data developed by the graphics processor 36 is stored in video RAM 44, which typically includes the frame buffer. Graphics processor 36 addresses the video ram 40 over the address bus 46 while supplying the video information over bus 50. Periodically, the output of the video RAM 44 is read out to a digital to analog converter 52 and then to a video display device 54 or to other raster scan display devices.

In the operation of system 30, clipped polygon information, in the form of parameter values for each vertex of a polygon is typically received by the graphics processor 36. Alternatively, that information could be calculated by the graphics processor. In either case, coordinate values for these polygon vertices are then converted by processor 36, using well known transformation techniques, to the output device coordinate space at subpixel resolution. Then, the scan conversion and filling of the polygons occurs. After determining the parameter values for each pixel center within the polygon, the coverage by the polygon of the pixel is determined.

If this coverage indicates that the polygon only partially covers the pixel, then blending of the pixel parameter values may be performed in order to improve the appearance of the polygon and particularly the edges of the polygon. After this, a display file is prepared for transfer to the frame butter, and typically, this display file contains the bit mapped image for the area covered by the polygon.

As will be understood by those of ordinary skill in the art, computer systems 10 and 30 may include more elements than are expressly shown in FIGS. 1 and 2 and described herein in detail. In addition, the individual elements shown in FIGS. 1 and 2 may be conventional items. Also, computer systems of the type shown in FIG. 2 are more appropriate for graphics intensive processing, and thus may be preferred for implementing or embodying the present invention. The present invention may be embodied in other computer systems as well, however.

Figure 3:
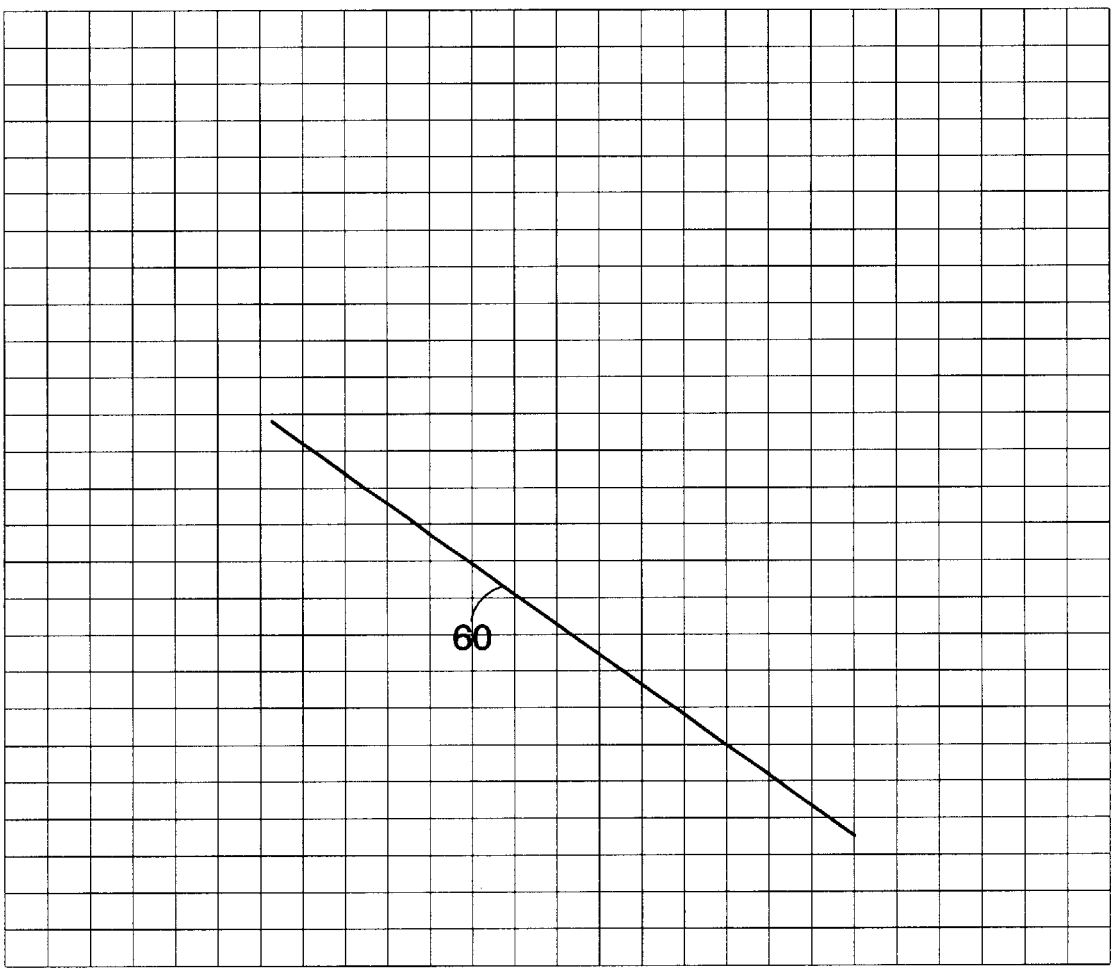
FIG. 3 shows a line drawn on a pixel array.

Computer systems of the general type shown in FIGS. 1 and 2 may display complex, three dimensional objects, and this can be done interactively to enable the user to manipulate the objects in real time. However, as mentioned above, difficulties may be encountered when displaying very thin or very small features, such as lines and points. With reference to FIG. 3, which shows a line 60 on a pixel array 62, these difficulties are due, principally, to the facts that only a small part of any one pixel is actually covered by the line and the pixels have a real size instead of being infinitely small points.

In accordance with the present invention, a procedure is provided for rendering a line for display on an array of pixels. With this procedure, and with particular reference to FIGS. 3 and 4, the line 60 is identified on the pixel array 62, the line is expanded into a rectangular polygon 64, and color values are determined for the pixels within the rectangular polygon. Also, an antialiasing region 66 is identified in the rectangular polygon 64, and blend values are computed for the pixels in this antialiasing region. Then, the color values determined for the pixels in the antialiasing region are modified as a function of these computed blend values. The pixels in the antialiasing region 66 may then be shown at their modified color values, while the pixels that are in the polygon 64 but not in the antialiasing region may be shown at their original determined color value.

Preferably, the blend values for the pixels in the antialiasing region are calculated as a function of the locations of the pixels in that region. More specifically, the blend value for each pixel in the antialiasing region is calculated as a function of a variable, Lo, that represents a distance value, referred to as the Manhattan distance, from the pixel to one edge of polygon 64. Preferably, the blend value for each of these pixels is calculated as a function of four Lo values, each one representing the Manhattan distance from the pixel to a respective one of the edges of this rectangular polygon 64.

Lo values and procedures for calculating these values are discussed in detail in copending application Ser. No. 09/053,589, filed Jan. 1, 1998, for "A Method And Apparatus To Efficiently Interpolate Polygon Attributes In Two Dimensions At A Prescribed Clock Rate," the disclosure of which is herein incorporated by reference. One advantage of using these Lo values is that they vary linearly across the pixel array. Because of this, typically, when Lo values are calculated, associated Lx and Ly values are also calculated, where Lx represents the change in Lo per pixel in the x direction across the pixel array, and Ly represents the change in Lo per pixel in the y direction across the pixel array.

With the preferred procedure of this invention, the above-mentioned four Lo values are calculated for a reference pixel in array 62, and this reference pixel may be within or outside the rectangular polygon 64. Also, for each of these Lo values, associated Lx and Ly values are calculated. After these values are calculated for the reference pixel, corresponding Lo values are calculated for other pixels in the pixel array by modifying the Lo values for the reference pixel by the associated Lx and Ly values as appropriate.

More specifically, the LO, Lx and Ly values for the reference pixel are calculated by the plane converter and the windower. To do this, with reference to FIG. 5, the plane converter first calculates Lo, Lx and Ly values for the reference pixel for the line or edge 60 and for two end or cap edges 70 and 72 that extend outward from the ends $V_0$ and $V_1$ of edge 60, perpendicular thereto. These calculations may be done using the following general formulas:

$$Lx = \frac{-\Delta y}{|\Delta x| + |\Delta y|} \quad (1)$$

$$Ly = \frac{\Delta x}{|\Delta x| + |\Delta y|} \quad (2)$$

$$Lo = Lx*(x_r - x) + Ly*(y_r - y) \quad (3)$$

where $\Delta x$ and $\Delta y$ are, respectively, the change in the x and y values between vertices or end points of the edge 60, x and y are the x and y coordinates of a vertex of the edge, and $x_r$ and $y_r$ are the coordinates of the reference pixel.

More specifically, the plane calculator calculates Lx0, Ly0 and Lo0 for the edge between vertices $V_0$ and $V_1$ using the following equations:

$$Lx0 = \frac{-(y_0 - y_1)}{|x_0 - x_1| + |y_0 - y_1|} \quad (4)$$

$$Ly0 = \frac{(x_0 - x_1)}{|x_0 - x_1| + |y_0 - y_1|} \quad (5)$$

$$Lo0 = Lx0 * (x_r - x_0) + Ly0 * (y_r - y_0) \quad (6)$$

where xo and yo are the x and y coordinates of vertex $V_0$ and $x_1$ and $y_1$ are the x and y coordinates of vertex $V_1$.

Because the cap edges 70 and 72 are perpendicular to the line edge 60, simplified equations can be used to calculate the edge coefficients for the cap edges. Generally, the edge coefficients for a cap edge are obtained by swapping the Lx and Ly terms for the line edge 60 and negating one of those terms. More specifically, Lx1=−Ly0, Ly1=Lx0, Lx2=Ly0, and Ly2=−Lx0, where Lx1 and Ly1 are the Lx and Ly coefficients for edge 70, also referred to as cap edge zero, and Lx2 and Ly2 are the Lx and Ly coefficients for edge 72, also referred to as cap edge one. The Lo1 and Lo2 coefficients for the cap edges 70 and 72 may be obtained using the general equation (3).

Figure 6:
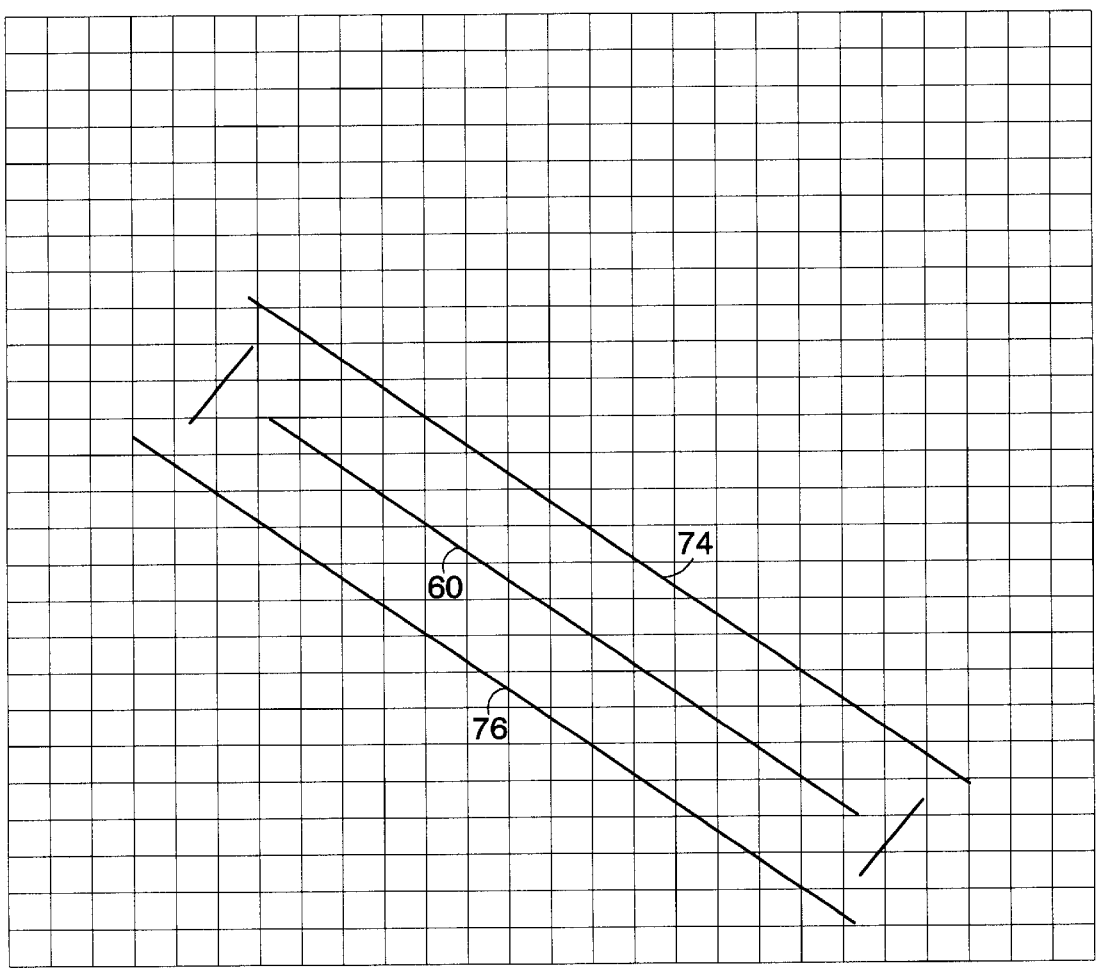
FIG. 6 shows the line edge of FIG. 3, two parallel side edges, and two additional associated end cap edges.

The windower receives the Lo, Lx and Ly coefficients for line edge 60 and cap edges 70 and 72; and, with reference to FIG. 6, the windower then calculates Lo, Lx and Ly coefficients for two edges 74 and 76 parallel to edge 60. These edges 74 and 76 are on opposite sides of edge 60 and are both spaced therefrom a distance specified by a variable LINE_WIDTH, which, for example, may vary from 0.0 to 3.5 pixels. Generally, the Lo coefficient for edge 74 is obtained by adding one-half LINE_WIDTH to Lo0, and then that sum is subtracted from LINE_WIDTH to obtain the Lo coefficient for edge 76. More specifically, Lo3=Lo0+LINE_WIDTH/2, and Lo4=LINE_WIDTH−Lo3, where Lo3 and Lo4 are the Lo edge coefficients for edges 74 and 76 respectively.

Figure 4:
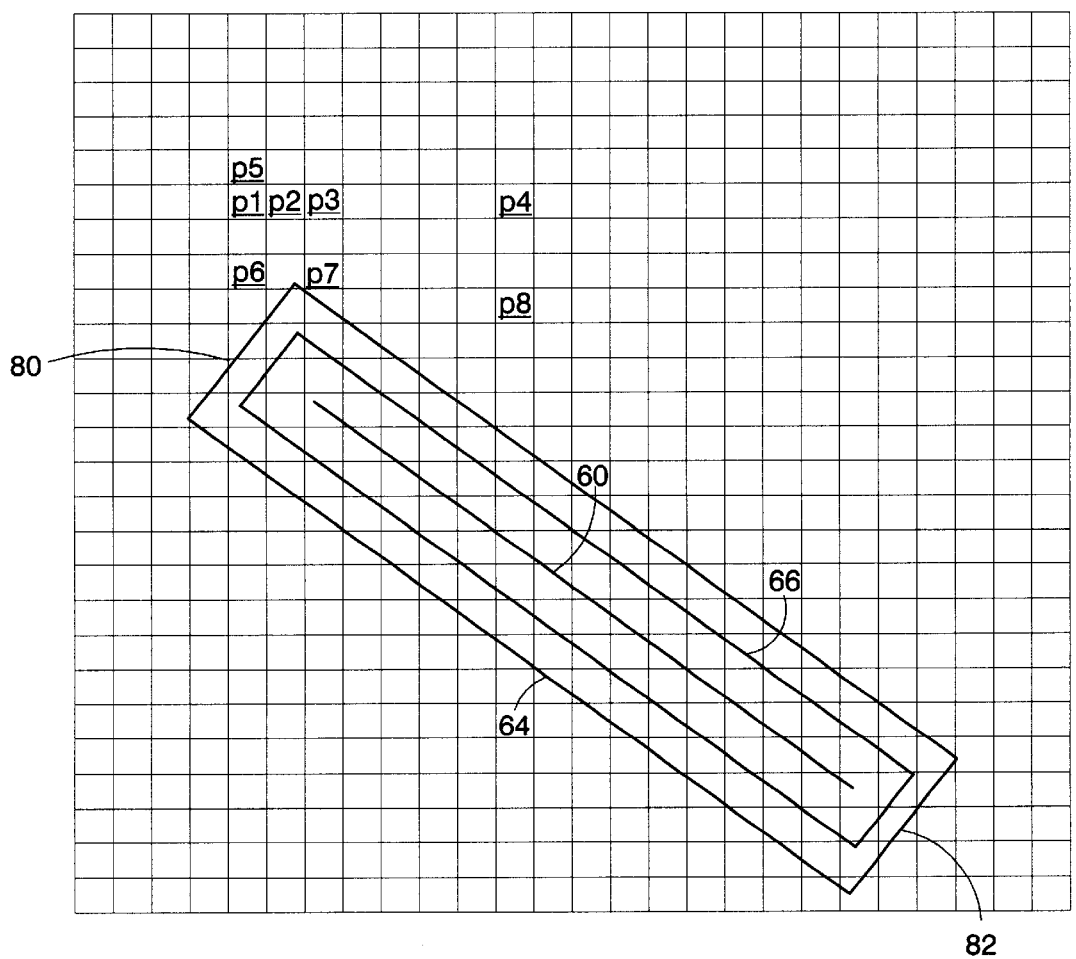
FIG. 4 shows a rectangular polygon formed from the line of FIG. 3.
Figure 5:
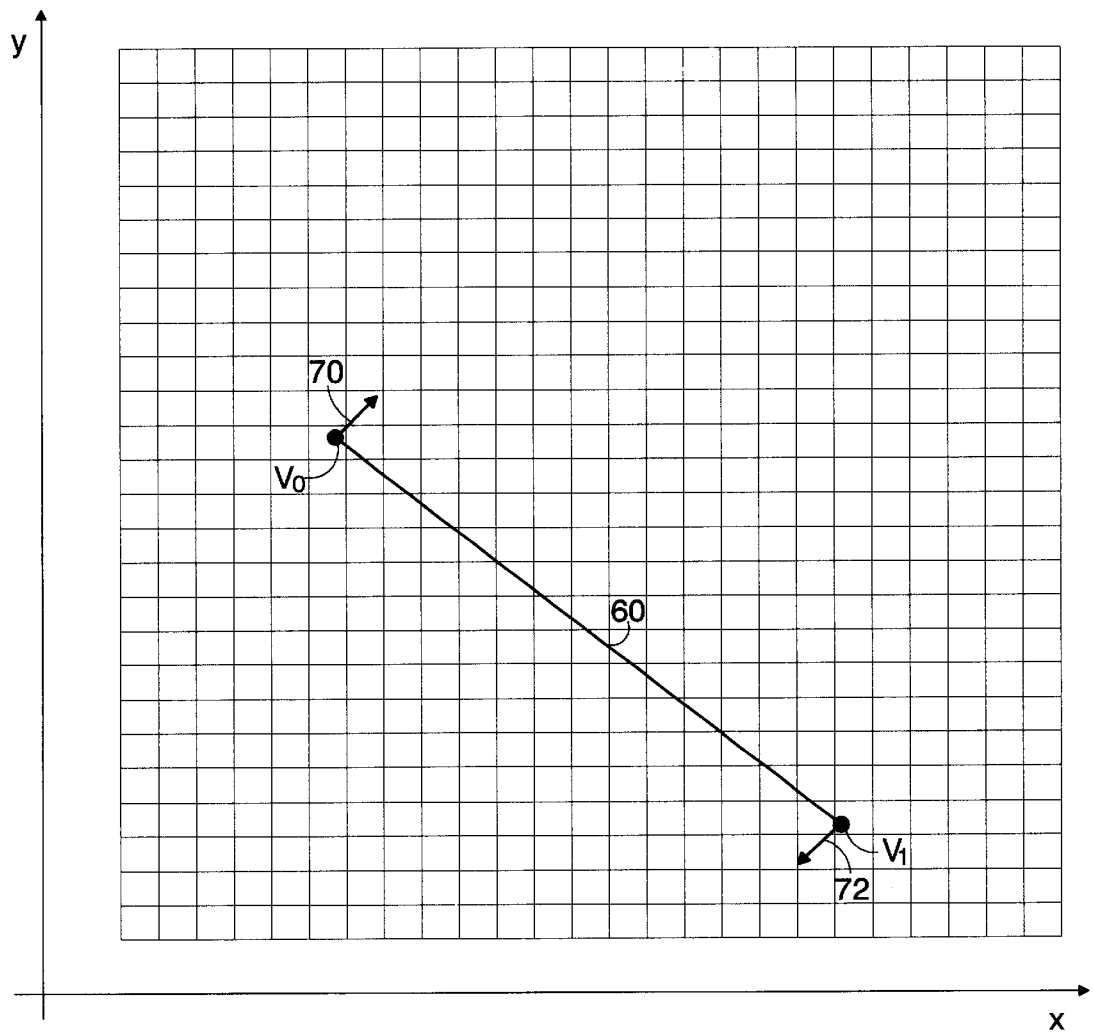
FIG. 5 shows the line edge of FIG. 3 and two associated end cap edges.

As previously mentioned, in the method of this invention, line 60 is expanded into rectangular polygon 64. With reference to FIGS. 4, 5 and 6, preferably, the long sides of polygon 64 are defined by the above-discussed edges 74 and 76, and thus the total width of the polygon 64 is LINE_WIDTH. Also, with the embodiment of polygon 64 shown in FIG. 4, end edges 80 and 82 of the polygon are parallel to and spaced outward from the above-discussed cap edges 70 and 72. Preferably, these edges 80 and 82 are spaced from the end points of edge 60 a distance of one-half a variable AA_REGION, discussed below. To account for this displacement of the cap edges, the above Lo3 and Lo4 values are both increased by one-half the value of AA_REGION. In this way, these values represent the Manhattan distance from the reference pixel to edge segments 80 and 82.

After line 60 is expanded into rectangular polygon 64, antialiasing region 66 is identified in that polygon. This region is specified by the variable AA_REGION, which represents the total width of the area over which blending for antialiasing is done. For example, this variable may have a value of 0.5, 1.0, 2.0 or 4.0 pixels, representing antialiasing regions of 0.25, 0.5, 1.0 or 2.0 pixels on each side of line 60. More specifically, antialiasing region 66 extends inward from each of edges 74 and 76 for a distance of AA_REGION, and the antialiasing region extends outward from each of edges 80 and 82 also for a distance of AA_REGION.

Once antialiasing region 66 is established, blend values are computed for the pixels in that region. As discussed above, the blend value for each pixel is calculated as a function of four Lo values for the pixel, corresponding to the four Lo values determined above for the reference pixel. Thus, to determine the blend value for each pixel, these four Lo values are first calculated for the pixel.

For each of the Lo values for the reference pixel, the corresponding Lo values for other pixels are computed by using the associated Lx and Ly values to modify Lo appropriately. More particularly, moving laterally across the pixel array 62, for each pixel traversed to the right, starting from the reference pixel, the value of Lo is increased by Lx, and for each pixel traversed to the left, starting from the reference pixel, the value of Lo is decreased by Lx. Analogously, moving vertically across the pixel array, for each pixel traversed upward, starting from the reference pixel, Lo is decreased by Ly, and for each pixel traversed downward, starting from the reference pixel, Lo is increased by Ly.

For example, with reference to FIG. 4, if the Lo value for the Manhattan distance between the reference pixel p1 and a first edge of polygon 64 is represented by Lo1, then the Lo1 value for pixel p2 is Lo+Lx. Also, the Lo1 value for pixel p3 is Lo+2Lx, and the Lo1 value for pixel p4 is Lo+7Lx. The Lo1 value for pixel p5 is Lo−Ly, and the Lo1 value for pixel p6 is Lo+2Ly. The Lo1 value for pixel p7 is Lo+2Lx+2Ly, and the Lo1 value for pixel p8 is Lo+7Lx+3Ly.

It may be noted that any suitable procedure may be used to determine whether a particular pixel is considered to be inside or outside the antialiasing region 66. Moreover, any appropriate technique may be employed to determine the order in which the pixels are analyzed to determine whether they are inside or outside the antialiasing region, and to determine the order in which the blend factors are calculated for the pixels. Suitable methods for making these determinations are disclosed in above-mentioned copending patent application for "A Method and Apparatus To Efficiently Interpolate Polygon Attributes In Two Dimensions At A Prescribed Clock Rate."

Generally, all of the pixels that are entirely inside the antialiasing region 66 are, naturally, considered to be inside that region. Pixels that are partially inside and partially outside that region are deemed to be inside or outside that region on the basis of the four Lo values calculated for the pixel. More particularly, the pixels that are intersected by a perimeter or border of region 66 are considered one at a time, for example in the order in which they are intersected by the border, moving either clockwise or counterclockwise along the border. For each of these pixels, the pixel is considered to be inside the antialiasing region 66 if all four Lo values calculated for the pixel are positive. In contrast, if any of the Lo values calculated for a pixel is negative, then the pixel is considered to be outside the the antialiasing region.

If a pixel is deemed to be inside the antialiasing region 66, a new blend factor, $\alpha$, is calculated for the pixel by multiplying the four Lo values computed for the pixel divided by one half the line antialiasing region. Specifically, $$\alpha = (Lo1/C)(Lo2/C)(Lo3/C)(Lo4/C) \quad (7)$$

where C=AA_REGION/2. Before this multiplication, each of the LoX/C's (where X=1, 2, 3 and 4) is clamped between 0 and 1.

This multiplication procedure, combined with the expansion, or outward displacement, of the end cap edges, allows for a semi-circular, or rounded, antialias of the line ends.

FIGS. 7A—7C conceptually illustrate the effects of the above-described antialiasing procedure. FIG. 7A represents at 86 the originally calculated color value for a point or pixel on line 60; and in particular, this color value is represented by the height of line segment 86 shown in the Figure. FIG. 7B represents a lateral cross section through this same point on line 60 after the line has been expanded into polygon 64. The uniform height of bar 88 represents the fact that the color values for the pixels along this cross section are all the same, which are equal to the color value represented at 86 in FIG. 7A. This cross-section through the expanded line may be referred to as a line mask.

FIG. 7C illustrates how the color values for the pixels along this line mask may be modified by the use of antialiasing region 66 and by the blend factor calculations for pixels in that region. If the antialiasing region is relatively small, only the pixels near the edges of the rectangle 64 may be affected, as represented at 90; and if the antialiasing region is larger, most or all of the pixels across the width of this rectangle may be affected, as represented at 92. In addition, because of the way the blend factors are calculated, the affect of these factors varies generally linearly on each side of rectangle 64, with that affect being greatest at the edge of the rectangle and linearly decreasing inwardly away from the edge.

The present invention may also be used to render other thin or small features, such as points. For example, FIG. 8 shows a point 94 on a pixel array 62. To render this point, two small perpendicular line segments are established for the point. These line segments are expanded into a rectangle that encloses the pixels of the point. The two perpendicular line segments are converted to the four edge coefficients with the equations:

$$Lo2 = Lo0 + Point\text{-}Width/2,$$

$$Lo3 = Point\text{-}Width + Lo2,$$

$$Lo4 = Lo1 + Point\text{-}Width,$$

$$Lo5 = Point\text{-}Width - Lo4.$$

The original Lo0 and Lo1 are derived with the definition of Lx, Ly and Lo. The four Lo values are calculated for the pixel, each one representing the Manhattan distance between the pixel center and a respective one edge of rectangle 98. A new blend factor is then calculated for the pixel using equation (7).

The embodiment of the invention described above utilizes a method for generating a rectangular set of edges to generate a line with a constant width. Other, known line generation algorithms may also be used in the practice of this invention. For example, there are known line generation algorithms that generate a line that is a single pixel wide and then replicate the pixels in the horizontal or vertical direction to increase the width of the line. The direction in which the line has the larger deviation (determined by the difference between the endpoints of the line) is termed the major direction, with the other direction being termed the minor direction. For instance, a line with an x delta of ten pixels and a y delta of two pixels would be termed x-major.

The replication of pixels is performed in the minor direction. This type of algorithm has the following two distinct behaviors: the end caps of the lines are aligned with the minor axis—that is, either the x-axis or the y-axis—and the width of the lines are not constant in the direction perpendicular to the line. Instead, the line width is constant in the minor direction.

In order to mimic this type of line generation algorithm in the implementation of the present invention, the following optional computations may be done. First, in order to support axis aligned end caps, the Lx and Ly computations (equations (1) and (2)) are changed to:

X-Major Line–Vertical Endcaps–Lx=+/−1.0,

Ly=0.0, (where the sign of Lx is based on left vs. right end).

Y-Major Line–Horizontal Endcaps–Lx=0.0

Ly=+/−1.0, (where the sign of Ly is based on top vs. bottom end).

The Lo calculations are the same as specified above in equations (4)–(6).

In addition, in order to support an axis-aligned line width, the perpendicular line width can be compressed by a factor approximating the sine or cosine of the angle of the line. By multiplying the original line width by Lx for an X-major line or by Ly for a Y-major line, the perpendicular line width is decreased by an amount which emulates the width achieved using a replication algorithm.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. A method for rendering a feature for display on an array of pixels, comprising;
    (a) identifying the feature on the array of pixels;
    (b) expanding the feature into a polygon on the array of pixels;
    (c) determining values for an attribute for the pixels within said polygon;
    (d) defining an antialiasing region in said polygon;
    (e) calculating blend factors for the pixels in said defined antialiasing region as a function of the location of each of the pixels in the defined antialiasing region with respect to edges of the polygon; and
    (f) for the pixels in the antialiasing region, modifying the attribute values determined for the pixels in step (c) as a function of the blend factors computed in step (e).

2. A method according to claim 1, wherein:
the step of expanding the feature into the polygon includes the step of forming the polygon with two side edges; and
the step of defining the antialising region includes the step of extending the antialiasing region inward a predetermined distance from each of said side edges.

3. A method according to claim 2, wherein:
the step of expanding the feature into the polygon further includes the step of forming the polygon with two end edges; and
the step of defining the antialiasing region further includes the step of extending the antialiasing region outward a preset distance from each of said end edges.

4. A method according to claim 1, wherein the calculating step includes the step of calculating the blend factor for each pixel in the antialiasing region as a function of a value representing a distance between the pixel and an edge of the polygon.

5. A method according to claim 1, wherein the step of expanding the feature into the polygon includes the steps of:
forming the polygon with two side edges; and
locating the two side edges parallel to each other and a predetermined distance apart.

6. A method according to claim 5, wherein the step of expanding the feature into the polygon further includes the steps of:
forming the polygon with first and second end edges;
identifying first and second end points of the feature on the pixel array;
locating the first end edge perpendicular to the side edges and a preset distance from said first end point; and
locating the second end edge perpendicular to the side edges and the preset distance from said second end point.

7. A method according to claim 1, wherein the step of expanding the feature into a polygon includes the step of generating, from the feature, a line having a uniform width on the array of pixels.

8. A method according to claim 7, wherein the array of pixels are arranged in a multitude of columns and rows, and the feature intersects a number of said columns and a number of said rows, and wherein the generating step includes the step of expanding the feature by a constant number of pixels in one of (i) each column intersected by the feature, and (ii) each row intersected by the feature.

9. A method according to claim 1, wherein the feature is a line.

10. A method according to claim 1, wherein the attributes are color values for the pixels.

11. A method for determining a blend factor for a pixel, wherein the pixel is one of an array of pixels and is located inside an antialising region and within a polygon, the method comprising the steps of:
(a) determining a first value representing a distance from the pixel to an edge of the polygon;
(b) determining a second value by dividing the first value by a factor representing a size of the antialiasing region;
(c) repeating steps (a) and (b) for each edge of the polygon; and
(d) determining the blend factor by computing the product of all the second values corresponding to edges of the polygon.

12. A method according to claim 11, wherein the antialising region has a uniform width, and the factor representing the size of the antialiasing region is a function of said unifirm width.

13. A method according to claim 11, further including the step of clamping the blend factor within a specified range to obtain a clamped blended factor.

14. A system for rendering a feature for display on an array of pixels, comprising:
means for identifying the feature on the array of pixels;
means for expanding the feature into a polygon on the array of pixels;
means for determining values for an attribute for the pixels within said polygon;
means for defining an antialiasing region in said polygon;
means for calculating blend factors for the pixels in said defined antialiasing region as a function of the location of each of the pixels in the defined antialiasing region with respect to edges of the polygon; and
means for modifying the attribute values determined for the pixels in the antialiasing region as a function of the computed blend factors.

15. A system according to claim 14, wherein:
the means for expanding the feature into the polygon includes means for forming the polygon with two side edges; and
the means for defining the antialiasing region includes means for extending the antialiasing region inward a predetermined distance from each of said side edges.

16. A system according to claim 14, wherein the means for expanding the feature into the polygon includes:
means for forming the polygon with two side edges; and
means for locating the two side edges parallel to each other and a predetermined distance apart.

17. A system according to claim 14, wherein the means for expanding the feature into the polygon includes means for generating, from the feature, a line having a uniform width on the array of pixels.

18. A system for determining a blend factor for a pixel, wherein the pixel is one of an array of pixels and is located inside an antialising region and within a polygon, the system comprising:
means for determining a plurality of first values, each of said first values representing a distance from the pixel to a respective one edge of the polygon;
means for determining a plurality of second values by dividing each of the first values by a factor representing a size of the antialiasing region;
means for determining the blend factor by computing the product of all the second values.

19. A system according to claim 17, wherein the antialising region has a uniform width, and the factor representing the size of the antialiasing region is a function of said uniform width.

\* \* \* \* \*